Jan. 20, 1959 G. S. WILLIAMS 2,869,154
PUSHER MEANS FOR FEEDING ARTICLES RELATIVE TO A THREADING SPINDLE INCLUDING MOTOR CONTROL MEANS RESPONSIVE TO FAILURE OF THE PUSHER MEANS TO ADVANCE
Filed Aug. 7, 1956 3 Sheets-Sheet 1
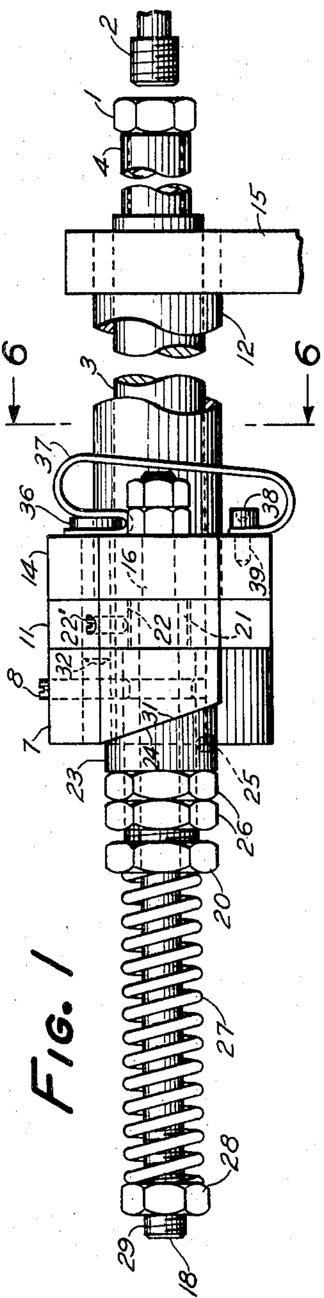
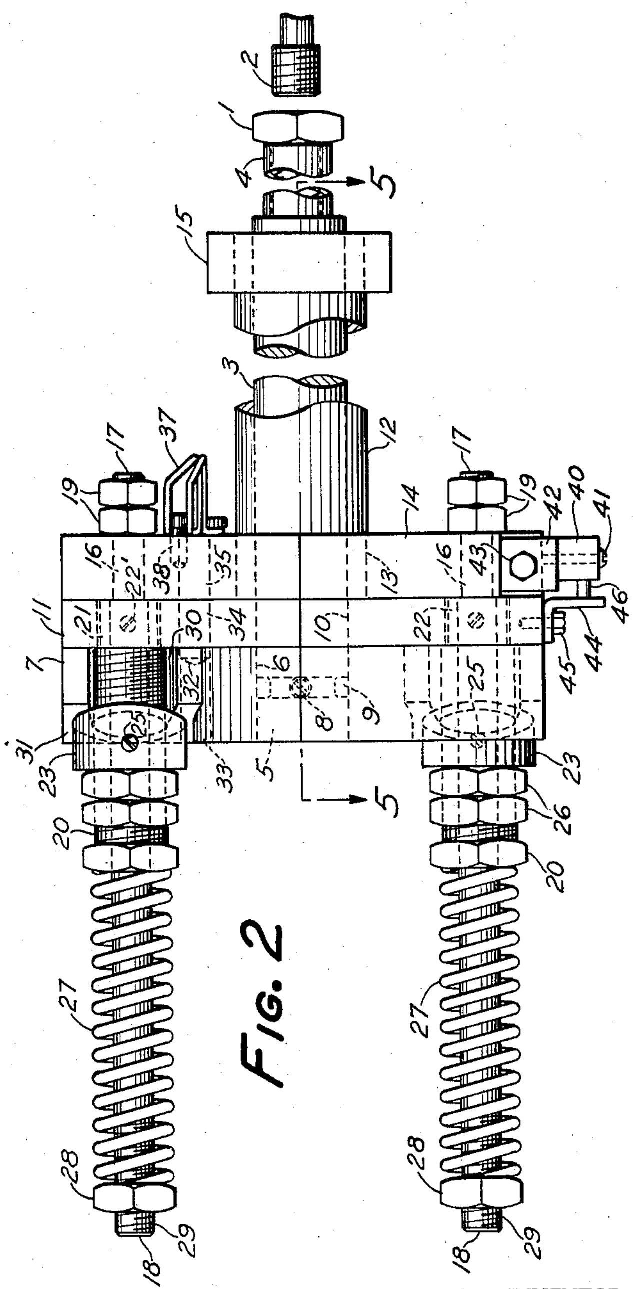
INVENTOR
Glenn S. Williams
BY Nevil Greenwell
ATTORNEY PUSHER MEANS FOR FEEDING ARTICLES RELATIVE TO A THREADING SPINDLE INCLUDING MOTOR CONTROL MEANS RESPONSIVE TO FAILURE OF THE PUSHER MEANS TO ADVANCE
Filed Aug. 7, 1956
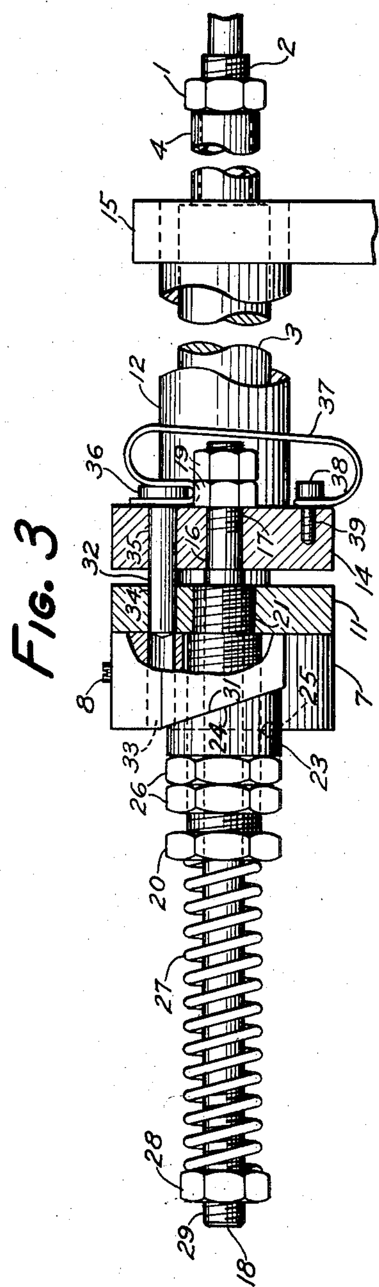
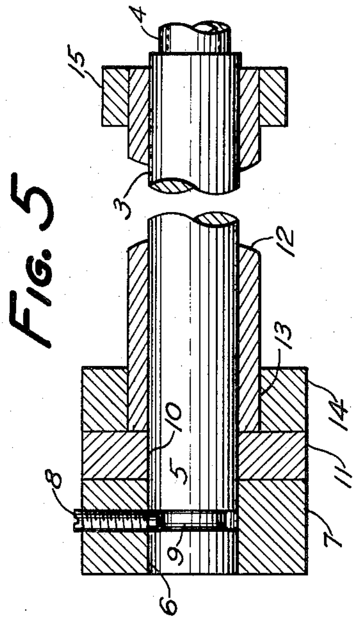
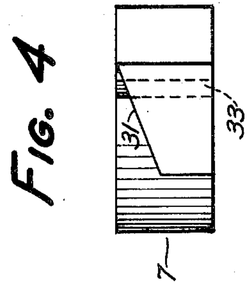
INVENTOR
Glenn S. Williams
BY Nevil Greenwell.
ATTORNEY PUSHER MEANS FOR FEEDING ARTICLES RELATIVE TO A THREADING SPINDLE INCLUDING MOTOR CONTROL MEANS RESPONSIVE TO FAILURE OF THE PUSHER MEANS TO ADVANCE
Filed Aug. 7, 1956 3 Sheets-Sheet 3
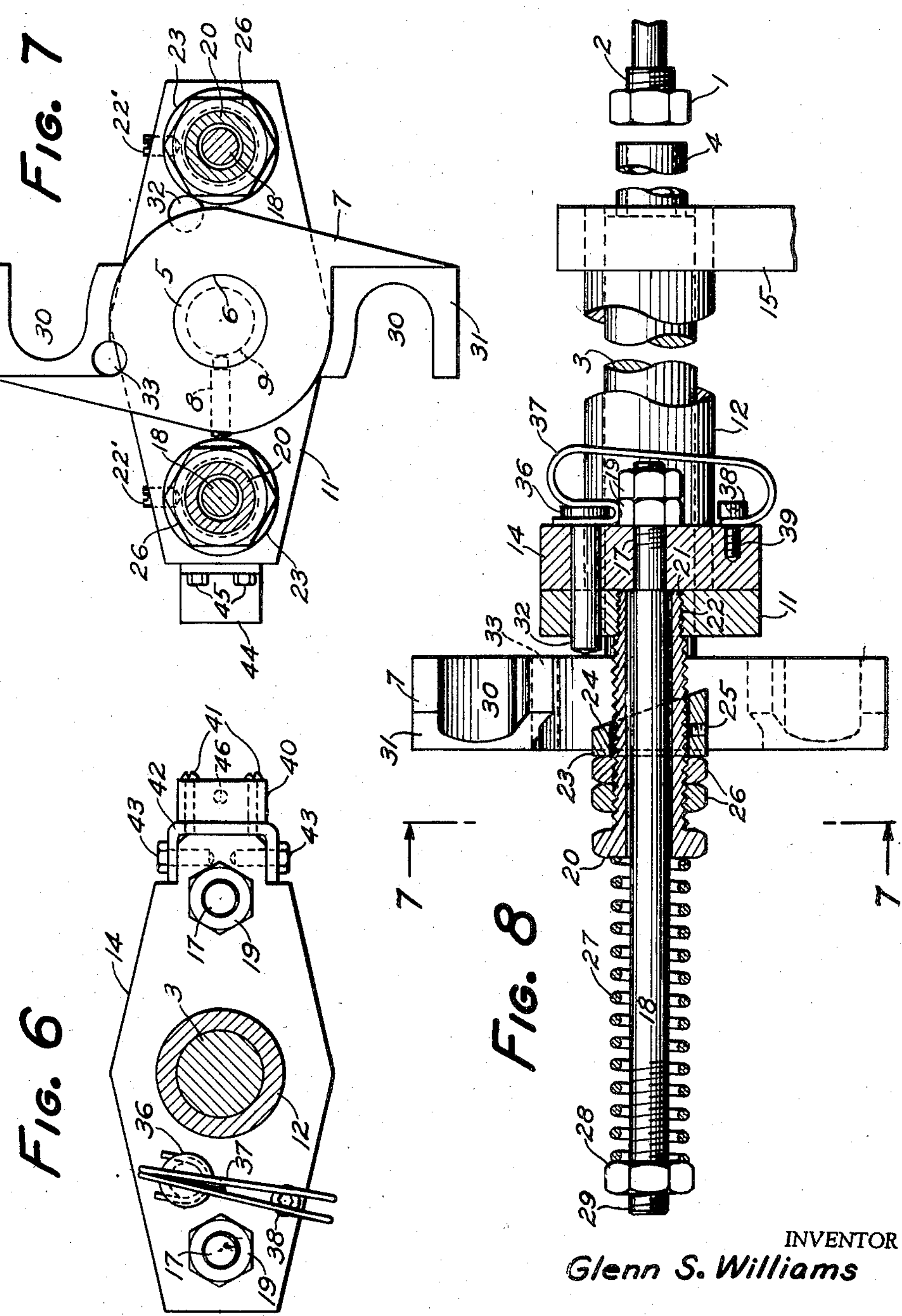
INVENTOR
Glenn S. Williams
BY Nevil Greenwell.
ATTORNEY United States Patent Office 2,869,154 Patented Jan. 20, 1959

2,869,154

PUSHER MEANS FOR FEEDING ARTICLES RELATIVE TO A THREADING SPINDLE INCLUDING MOTOR CONTROL MEANS RESPONSIVE TO FAILURE OF THE PUSHER MEANS TO ADVANCE

Glenn S. Williams, Myerstown, Pa., assignor to Bethlehem Steel Company, a corporation of Pennsylvania Application August 7, 1956, Serial No. 602,555

4 Claims. (Cl. 10—139)

This invention relates in general to machines for threading metal blanks, and more particularly to a pusher release mechanism for nut tapping machines.

In standard tapping machines of this type, a pusher mechanism advances a succession of individual nut blanks received from suitable supply means into a spinning head or chuck and thence onto a threading tap, generally stationary, which cuts a female thread inside the cylindrical bore of the rotating nut blank so as to form a finished nut. If for any reason one blank sticks on the tap, excessive stress and damage to the machine are very likely to result unless a dependable safety device is provided. Various types of slipping clutches and similar devices have been tried for this purpose heretofore, but none has been sufficiently quick and sensitive to be safe and reliable on high speed machines.

One object of this invention, therefore, is to provide a rapid release mechanism which will protect the pusher mechanism from being overloaded during the tapping operation.

Another object is to provide means for stopping the machine and preventing additional nut blanks from being fed after one blank has failed to accept tapping.

An additional object is a pusher release which is easily adjusted to any desired degree of sensitivity.

A further object is a pusher release which is readily reset and returned to operating condition after correction of machine malfunction.

Still other objects, advantages and purposes of the invention will appear hereinafter in the specification, claims and drawings.

In the attached three (3) sheets of drawings:

Fig. 1 is a side elevation of the closed pusher release before the operation of tapping the nut blank begins;

Fig. 2 is a plan view of the mechanism shown in Fig. 1;

Fig. 3 is a side elevation, shown partly in section, of the same mechanism at the moment just prior to release of the pusher;

Fig. 4 is a detail of the rear cross-arm of the pusher release mechanism;

Fig. 5 is a vertical section taken on the line 5—5 of Fig. 2;

Fig. 6 is a transverse vertical section on the line 6—6 of Fig. 1;

Fig. 7 is a transverse vertical section on the line 7—7 of Fig. 8; and

Fig. 8 is a longitudinal vertical section along one stud and the release pin, and with the pusher retracted from the nut blank.

Referring now to the drawings in detail, reference numeral 1 designates a nut blank which is advanced through a conventional rotating head or chuck (not shown) onto a tap 2 by means of a pusher 3. Said pusher 3 is a cylindrical member having a reduced forward portion 4 which engages the rear face of the nut blank 1. The larger rear end portion 5 of the pusher 3 is adapted to serve as a pivot in the center hole 6 of the S-shaped rear cross-arm 7 by any suitable swivel joint, here exemplified by a set screw 8 projecting loosely into a circumferential groove 9 on said pusher end portion 5. Said pusher extends forward through a center hole 10 in an intermediate cross-arm 11 and through a tubular sleeve 12 which has its rear end fastened as by brazing in a hole 13 in the front cross-arm 14 and its forward end clamped to a reciprocating lever arm 15.

Adjacent the outer ends of the front cross arm 14 are stud holes 16 through which the reduced threaded ends 17 of the spring studs 18 project and are secured by lock nuts 19. The larger portion of each stud 18 extends backward through a tubular bushing 20 having a reduced end portion 21 which is threaded into a tapped hole 22 and secured by set-screws 22' in the intermediate cross-arm 11. The larger end of each bushing 20 has thereon a collar 23 having an inclined face 24 and secured by a set-screw 25, together with a pair of lock nuts 26. A coil spring 27 coaxially about each stud 18 is interposed between the top of each bushing 20 and an adjusting nut 28 on the threaded end 29 of the larger portion of said stud 18.

Adjacent the outer ends of the rear cross-arm 7 are a pair of oppositely facing half round slots 30 adapted to receive the bushings 20, and a pair of circumjacent oppositely inclined rear faces 31 which correspond to the inclined faces 24 on the collars 23 and are normally held in close facial engagement therewith by means of a release pin 32 extending through aligned holes 33, 34 and 35 in the respective cross-arms. Said release pin 32 has a cap portion 36 engaging a yieldable downwardly pressing member such as the hairpin spring 37 secured by the screw 38 in the tapped hole 39 in the front cross-arm 14.

A switch 40 is mounted by screws 41 on the bracket 42 which is fastened by screws 43 to one end of the front cross-arm 14. A stop such as the angle 44 is mounted by screws 45 on the adjacent end of the intermediate cross-arm 11 and normally retains the push button 46 of said switch 40 in the closed position, so that the circuit to the motor (not shown) which drives the machine is not interrupted until the intermediate and front cross-arms are separated.

The operation of the invention is quite simple. Taking Figs. 1 and 2 as the start of the operation, machine force applied through the lever arm 15 will propel the entire pusher mechanism to the right, thereby pushing the blank 1 into the jaws of the spinning head (not shown), and onto the tap 2. If for some reason the blank 1 becomes jammed, the pusher 3 and the rear cross-arm 7 connected to it will cease their forward movement. The intermediate cross-arm 11, on which the bushings 20 are mounted, also stops. However, the forward cross-arm 14, being connected by the sleeve 12 to the lever arm 15, will continue to move to the right. This retracts the spring studs 18 into the bushings 20, thereby compressing the springs 27 further and opening a gap between the now stationary intermediate cross-arm 11 and the still advancing forward cross-arm 14, as shown in Fig. 3. The opening of said gap automatically cuts off the current to the motor (not shown) through the switch 40. The lock nuts 26 and collars 23 keep the intermediate cross-arm 11 from pulling axially away from the rear cross-arm 7.

Referring now to Figs. 7 and 8, as the forward cross-arm 14 moves away from the intermediate cross-arm 11, it pulls the release pin 32 entirely out of the rear cross-arm 7, whereupon its inclined faces 31 slide over the inclined faces 24 of the collars 23 and cause the rear cross-arm 7 to turn and free the pusher 3. The power being off, the released pusher 3 can now be pushed freely to the left by hand and the trouble can be corrected.

The intermediate cross-arm 11 and the forward cross-arm 14 automatically go back together when the rear cross-arm 7 is freed, and cause the release pin 32 to extend from the intermediate cross-arm 11. As the rear cross-arm 7 is pushed manually to the right and turned into place under the collars 23, the release pin 32 is forced back against its spring 37 until the hole 33 in said rear cross-arm 7 meets said release pin 32, which then snaps into place and renders the mechanism again ready for operation.

The lock nuts 26 permit adjusting the inclined collars 23 against the inclined faces 31 on the rear cross-arm 7 so that it will turn freely into place. The distance the release pin 32 extends into the end hole 33 can easily be changed by using pins of different lengths, with a pin as short as is operatively possible making the most sensitive release. The adjusting nuts 28 permit any desired force to be set up in the springs 27 before the release will open.

Although I have thus described my invention hereinabove in considerable detail, I do not wish to be limited narrowly to the exact and specific particulars disclosed, but I may also use such substitutes, modifications or equivalents as are included within the scope and spirit of the invention or pointed out in the appended claims.

I claim:

1. In a safety mechanism for a tapping machine, electrically driven power means for said machine, a series of parallel adjacent cross-members of which the foremost cross-member is operatively connected to the power means, spring-pressed means normally holding the cross-members together, a pusher for advancing a workpiece, said pusher being mounted on the rearmost cross-member and extending freely forward through the other cross-members, means for limiting the maximum separation of said rearmost cross-member from an intermediate cross-member, a pin carried by the foremost cross-member, rotary latch means in which the pin is normally engaged on said rearmost cross-member said latch means being adapted to be disengaged from the adjacent cross-member upon withdrawal of the pin from the latch means when the pusher encounters excessive resistance during motion of the foremost cross-member, and switch means mounted on one of said cross-members and actuated by the movement of an adjacent cross-member to disconnect the power means from its current source.

2. In a safety mechanism for a nut tapping machine, a first cross-member, electric driving means for reciprocating said first cross-member, a switch on said first cross-member and connected to said driving means, a forwardly extending sleeve mounted centrally on said first cross-member, rearwardly extending studs secured at the outer ends of said first cross-member, a second cross-member normally in facial contact with the first cross-member, means on said second cross-member for holding the switch normally closed, rearwardly extending bushings attached to said second cross-member through which the studs project, a third cross-member normally in facial contact with the second cross-member, said third cross-member having side slots opening in opposite directions for receiving the bushings and having inclined faces circumjacent the side slots, collars having counterpart inclined faces mounted on the bushings, lock nuts on said bushings, springs on the studs biased against said bushings, adjusting nuts on said studs for varying the spring pressure, a forwardly extending pusher rotatably mounted in the third cross-member and freely movable axially through the second cross-member and the sleeve, and a release pin carried by the first cross-member and extending rearwardly through the three cross-members, said pin being retractable from the third cross-member to permit said third cross member to disengage from the collars at a predetermined pressure on the pusher.

3. A safety device for a machine having mechanism for advancing a workpiece, said device comprising a first cross-member, a motor circuit and motor driving said cross-member, a second cross-member in parallel relation to the first cross-member, resilient means normally holding the first and second cross-members together, switch means positioned for actuation by separation of the first and second cross-members to interrupt the motor circuit, inclined detent members carried by the second cross-member, a third cross-member having inclined latching surfaces normally engaging the detent members, a pin carried by the first cross-member and extending through the second cross-member into the third cross-member, and a pusher rotatably carried by the third cross-member, said third cross-member being adapted to turn and release from the detent members when the pusher has been retarded by the workpiece and the first cross-member has advanced sufficiently to actuate the switch means and to withdraw the pin from the third cross-member.

4. In a safety mechanism for a tapping machine, a series of cross-members, electrically driven power means for imparting forward motion to the foremost cross-member, a retractable pin carried by said foremost cross-member and extending rearwardly through said cross-members, yieldable means normally urging said cross-members together, a forwardly extending pusher mounted on the rearmost cross-member, latch means normally connecting the foremost and the rearmost cross-members and adapted to cause separation of the cross-members after excessive resistance against the pusher while the foremost cross-member is still advancing has caused withdrawal of the pin from the rearmost cross-member, and an electric circuit including normally closed switch means connected to the power means, said switch means being actuated by the separation of cross-members as aforesaid to interrupt the electric circuit to the power means.

No references cited.